(12) United States Patent
Tamura et al.

(10) Patent No.: US 6,916,581 B2
(45) Date of Patent: Jul. 12, 2005

(54) ELECTRODE FOR RECHARGEABLE LITHIUM BATTERY AND RECHARGEABLE LITHIUM BATTERY

(75) Inventors: Noriyuki Tamura, Kobe (JP); Ryuji Ohshita, Tokushima (JP); Maruo Kamino, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 379 days.

(21) Appl. No.: 10/103,127

(22) Filed: Mar. 22, 2002

(65) Prior Publication Data

US 2002/0168572 A1 Nov. 14, 2002

(30) Foreign Application Priority Data

Mar. 23, 2001 (JP) ........................................ 2001-084761

(51) Int. Cl.⁷ ............................ H01M 4/40; H01M 4/66
(52) U.S. Cl. ............................ 429/231.95; 429/218.1; 429/220; 429/245
(58) Field of Search ............................ 429/218.1, 220, 429/231.95, 245

(56) References Cited

U.S. PATENT DOCUMENTS 6,051,340 A * 4/2000 Kawakami et al. .... 429/231.95
6,506,520 B1 * 1/2003 Inoue et al. ............ 429/231.95

FOREIGN PATENT DOCUMENTS

| JP | 8-124568 A | 5/1996 |
| JP | 11-185753 A | 7/1999 |
| JP | 2000-173591 A | 6/2000 |
| JP | 2000-228202 A | 8/2000 |
| WO | WO 00/33402 | * 6/2000 |

OTHER PUBLICATIONS

K. D. Kepler et al.; "$Li_xCu_6Sn_5$ (0<x<13): An Intermetallic Insertion Electrode for Rechargeable Lithium Batteries", *Electrochemical and Solid–State Letters*, vol. 2, no. 7, pp. 307–309 (1999).

* cited by examiner

Primary Examiner—Jonathan Crepeau
(74) Attorney, Agent, or Firm—Kubovcik & Kubovcik

(57) ABSTRACT

An electrode for a rechargeable lithium battery, comprising a current collector layer composed of a metal incapable of alloying with Li, an active material layer provided on said current collector layer and composed of a metal capable of alloying with Li and a surface coating layer provided on a surface of said active material layer, opposite to the surface on which the current collector layer is provided, and composed of a metal incapable of alloying with Li or composed of an alloy of a metal incapable of alloying with Li and a metal capable of alloying with Li.

13 Claims, 1 Drawing Sheet

ELECTRODE FOR RECHARGEABLE LITHIUM BATTERY AND RECHARGEABLE LITHIUM BATTERY

BACKGROUND OF THE INVENTION

1. Field of the Invention

The present invention relates to an electrode for a rechargeable lithium battery and a rechargeable lithium battery utilizing the same.

2. Description of Related Art

The battery characteristics of rechargeable lithium batteries recently under extensive development and research, such as charge-discharge voltage, charge-discharge cycle life characteristics and storage characteristics, depend largely upon the types of the electrodes used. This has led to the various attempts to better battery characteristics by improving electrode active materials.

The use of metallic lithium for the negative active material enables construction of batteries which exhibit high energy densities per weight and volume. However, the lithium deposited during charge grows into dendrite, which could cause problematic internal short-circuiting.

On the other hand, rechargeable lithium batteries are reported (Solid State Ionics, 113–115, p57(1998)) using an electrode composed of aluminum, silicon, tin or the like which alloys electrochemically with lithium during charge.

The inventors of this application have previously found that an electrode including a current collector such as a copper foil and a thin film deposited thereon by an electrolytic plating process and composed of tin or the like which can alloy with lithium provides a high charge-discharge capacity and exhibits relatively good cycle characteristics when it is incorporated in a rechargeable lithium battery.

However, if such an electrode for a rechargeable lithium battery is to be more practical, its cycle performance characteristics must be further improved.

SUMMARY OF THE INVENTION

It is an object of the present invention to provide an electrode for a rechargeable lithium battery, which provides a high charge-discharge capacity and exhibits improved charge-discharge characteristics and also to provide a rechargeable lithium battery using the same.

The electrode for a rechargeable lithium battery, in accordance with the present invention, has a current collector layer composed of a metal incapable of alloying with Li, a layer of active material provided on the current collector layer and composed of a metal capable of alloying with Li, and a surface coating layer provided on a surface of the active material layer, opposite to its surface carrying the current collector layer, and composed of a metal incapable of alloying with Li or composed of an alloy of a metal incapable of alloying with Li and a metal capable of alloying with Li.

In the present invention, the surface coating layer containing a metal incapable of alloying with Li is provided on the layer of active material. The presence of the surface coating layer prevents a reaction of the electrolyte and a surface of the active material layer. This results in suppressing deterioration of the active material layer at its surface and improving charge-discharge cycle characteristics.

In the present invention, the metal capable of alloying with Li can be illustrated by a metal which can enter into a solid solution or intermetallic compound with Li. Examples of such metals include Sn (tin), Ge (germanium), Al (aluminum), In (indium), Mg (magnesium), Pb (lead), Bi (bismuth), Zn (zinc) and the like. The above-listed metals capable of alloying with Li may be contained in any combination. That is, the layer of active material may contain two or more of such metals capable of alloying with Li. It may contain an alloy of two or more of such metals capable of alloying with Li.

In the present invention, the metal incapable of alloying with Li can be illustrated by a metal which can not enter into a solid solution or intermetallic compound with Li, more specifically by a metal which does not show the presence of an alloy state in a binary phase diagram. Examples of metals incapable of alloying with Li include Cu (copper), Fe (iron), Ni (nickel), Co (cobalt), Mn (manganese), Ti (titanium), Zr (zirconium), Mo (molybdenum), W (tungsten), Ta (tantalum) and the like. Two or more of the above-listed metals incapable of alloying with Li may be contained.

In the present invention, the surface coating layer may be composed of either a metal incapable of alloying with Li or an alloy of a metal incapable of alloying with Li and a metal capable of alloying with Li. The metal capable of alloying with Li, contained in the alloy, may be identical or different in type from that constituting the layer of active material. For example, in the case where Sn constitutes the layer of active material, the surface coating layer may be composed of an Sn alloy, a Ge alloy or an alloy of other metal capable of alloying with Li.

The metal incapable of alloying with Li, contained in the surface coating layer, may be identical or different in type from that constituting the current collector layer. For example, in the case where the current collector layer is composed of Cu, the surface coating layer may be composed of Cu, Fe or other metal incapable of alloying with Li.

In the present invention, the layer of active material is provided on the current collector layer. One method of providing the layer of active material on the current collector layer involves depositing a metal capable of alloying with Li on a substrate serving as the current collector layer to form the layer of active material thereon. For example, the layer of Sn active material can be formed by depositing Sn on a Cu substrate, such as a copper foil, which serves as the current collector layer. An alternative method involves depositing a metal incapable of alloying with Li on a substrate serving as the layer of active material to form the current collector layer thereon. For example, the Cu current collector layer can be formed by depositing Cu on an Sn substrate, such as a tin foil, which serves as the layer of active material. A plating, sputtering, vapor deposition or other technique can be utilized to form the active material layer or the current collector layer. Examples of vapor deposition techniques include CVD and vacuum vapor evaporation. Examples of plating techniques include electroplating and electroless plating.

In the present invention, a mixed phase in which a component of the surface coating layer is mixed with a component of the active material layer may be formed at an interface between the surface coating layer and the active material layer. Such a mixed phase can be formed, for example, by depositing the surface coating layer on the layer of active material and subjecting the resulting stack to a heat treatment. In the mixed phase, a component of the surface coating layer may enter into a solid solution or intermetallic compound with a component of the active material layer. The mixed phase may take a crystalline or amorphous form.

In the formation of the mixed phase, the heat treatment may preferably be carried out at a temperature which is approximately 50% or 105% of a melting point of the metal or alloy in the surface coating layer or in the active material layer, whichever is lower. In the case where a Cu layer and an Sn layer are used to constitute the surface coating layer and the active material layer, respectively, because a melting point of Cu is 1085° C. and that of Sn is 232° C., the heat treatment may preferably be performed at a temperature that is 50%–105% of the lower melting point, 232° C., i.e., within the range of 116–243° C. The mixed phase can be formed more effectively if the heat treatment is performed at a temperature within the range of 160–240° C. During such a heat treatment, a component of the active material layer may also be mixed with a component of the current collector layer to form another mixed phase at an interface between the current collector layer and the active material layer.

In the present invention, the thickness of the surface coating layer is preferably up to 0.2 $\mu$m, more preferably up to 0.1 $\mu$m. If the surface coating layer is excessively thick, a reaction between the active material layer and Li in an electrolyte may be inhibited to result in the reduced charge-discharge capacity. Preferably, the thickness of the surface coating layer is not below 0.01 $\mu$m. Accordingly, the thickness of the surface coating layer is preferably in the approximate range of 0.01–0.2 $\mu$m. If the surface coating layer is excessively thin, the effect of inhibiting the reaction between the active material layer and the electrolyte may be obtained in an insufficient manner.

In the present invention, in the case where a metal capable of alloying with Li is deposited on a substrate serving as the current collector layer to form the layer of active material thereon, it is preferred that the substrate has rough surface. The formation of such surface roughness improves adhesion between the substrate and the active material layer and thus prevents separation of the active material layer during a charge-discharge reaction. The surface roughness Ra of the substrate is preferably in the approximate range of 0.01–2 $\mu$m. The surface roughness Ra is defined in Japan Industrial Standards (JIS B 0601-1994) and can be determined by a surface roughness meter, for example. A copper foil known to have a large surface roughness Ra is an electrolytic copper foil. Such an electrolytic copper foil is preferred for use as the substrate. The thickness of the substrate is preferably up to about 50 $\mu$m, when its energy densities per weight and volume are taken into consideration.

The rechargeable lithium battery of the present invention is characterized as including a negative electrode comprised of the electrode of the present invention for a rechargeable lithium battery, a positive electrode and a nonaqueous electrolyte.

An electrolyte solvent for use in the rechargeable lithium battery of the present invention is not particularly specified in type but can be illustrated by a mixed solvent which contains cyclic carbonate such as ethylene carbonate, propylene carbonate, butylene carbonate or vinylene carbonate and also contains chain carbonate such as dimethyl carbonate, methyl ethyl carbonate or diethyl carbonate. Also applicable is a mixed solvent of the aforementioned cyclic carbonate and an ether solvent such as 1,2-dimethoxyethane or 1,2-diethoxyethane. Examples of electrolyte solutes include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$ and mixtures thereof. Other applicable electrolytes include a gelled polymer electrolyte comprised of an electrolyte solution impregnated into a polymer electrolyte such as polyethylene oxide or polyacrylonitrile, and inorganic solid electrolytes such as LiN and $Li_3N$, for example. The electrolyte for the rechargeable lithium battery of the present invention can be used without limitation, so long as an Li compound as its solute that imparts an ionic conductivity, together with its solvent that dissolves and retains the Li compound, remain undecomposed at voltages during charge, discharge and storage of the battery.

Examples of useful active materials for the positive electrode of the rechargeable lithium battery of the present invention include lithium-containing transition metal oxides such as $LiCoO_2$, $LiNiO_2$, $LiMn_2O_4$, $LiMnO_2$, $LiCo_{0.5}Ni_{0.5}O_2$ and $LiNi_{0.7}Co_{0.2}Mn_{0.1}O_2$; lithium-free metal oxides such as $MnO_2$; and the like. Other substances can also be used, without limitation, if they are capable of electrochemical lithium insertion and deinsertion.

DESCRIPTION OF THE PREFERRED EXAMPLES

Figure 1:
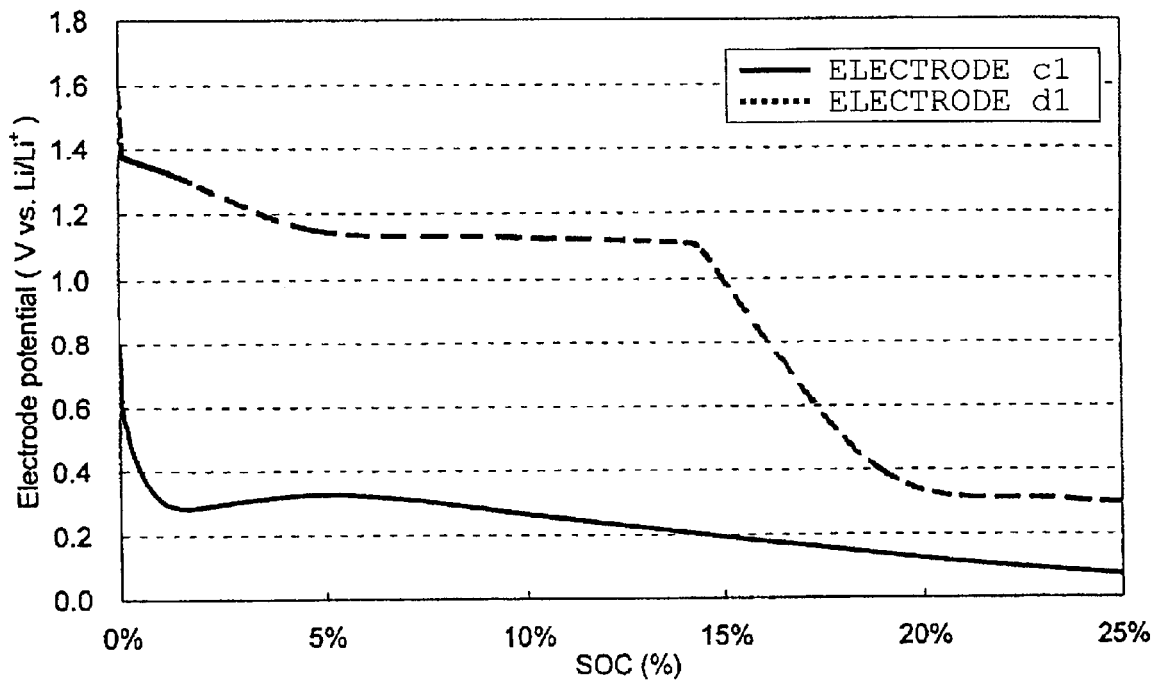
FIG. 1 is a graph showing the 2nd-cycle charge curve of the electrode in accordance with the present invention.

The present invention is now described in more detail with reference to examples. It will be recognized that the following examples merely illustrate the practice of the present invention but are not intended to be limiting thereof. Suitable changes and modifications can be effected without departing from the scope of the present invention.

(Experiment 1)

(Fabrication of Electrodes)

A thin film of tin was deposited on a 18 $\mu$m thick electrolytic copper foil (surface roughness Ra=0.188 $\mu$m) at a thickness of 2 $\mu$m by an electroplating process. Tin was used as an anode and a composition of the plating bath used is specified in Table 1.

TABLE 1

| Composition | Concentration |
| --- | --- |
| Stannous Sulfate | 40 g · dm$^{-3}$ |
| Sulfuric Acid (98%) | 150 g · dm$^{-3}$ |
| Formalin | 5 cm$^3$ · dm$^{-3}$ |
| Additive (Product of C. Uyemura & Co., Ltd.) | 40 cm$^3$ · dm$^{-3}$ |

In the manner as described above, the thin tin film serving as the active material layer was deposited on the electrolytic copper foil which served as the current collector layer. Subsequently, a Cu layer was deposited on the thin tin film at a thickness of 0.02 $\mu$m by an electroplating process. Copper was used as an anode and a composition of the plating bath used is specified in Table 2.

TABLE 2

| Composition | Concentration |
| --- | --- |
| Copper Cyanide | 20 g · dm$^{-3}$ |
| Sodium Cyanide | 30 g · dm$^{-3}$ |

In the manner as described above, the Cu layer serving as the surface coating layer was deposited on the thin tin film which served as the active material layer. The resulting electrode was designated as an electrode a1 of the present invention.

Following the preceding procedure for a deposition of a thin film of tin on an electrolytic copper foil, a 0.02 μm thick Sn—Cu alloy layer was deposited on the thin tin film by an electroplating process. A segmented positive electrodes of copper and tin were used as an anode and a composition of the plating bath used is specified in Table 3. The thickness of the electrodeposited thin film or layer was calculated from a current density and a deposition time. The Cu and Sn—Cu alloy layers were very thin. It is accordingly considered that each layer does not provide a uniform coating on the tin thin film but is distributed over the thin tin film like a group of islands.

TABLE 3

| Composition | Concentration |
| --- | --- |
| Copper Cyanide | 11 g · dm$^{-3}$ |
| Sodium Stannate (Trihydrate) | 90 g · dm$^{-3}$ |
| Sodium Cyanide | 27 g · dm$^{-3}$ |
| Sodium Hydroxide | 16 g · dm$^{-3}$ |

In the manner as described above, the Sn—Cu alloy layer serving as the surface coating layer was deposited on the thin tin film which served as the active material layer. The resulting electrode was designated as an electrode a2 of the present invention.

For a comparative purpose, a thin film of tin was deposited on an electrolytic copper foil in the same manner as described above. This electrode was designated as a comparative electrode b1. Accordingly, this comparative electrode b1 does not carry the surface coating layer on the thin tin film.

(Preparation of Electrolyte Solution)

1 mole/liter of LiPF$_6$ was dissolved in a mixed solvent containing ethylene carbonate and dimethyl carbonate at a 1:1 ratio by volume to prepare an electrolyte solution.

(Construction of Beaker Cell)

Figure 2:
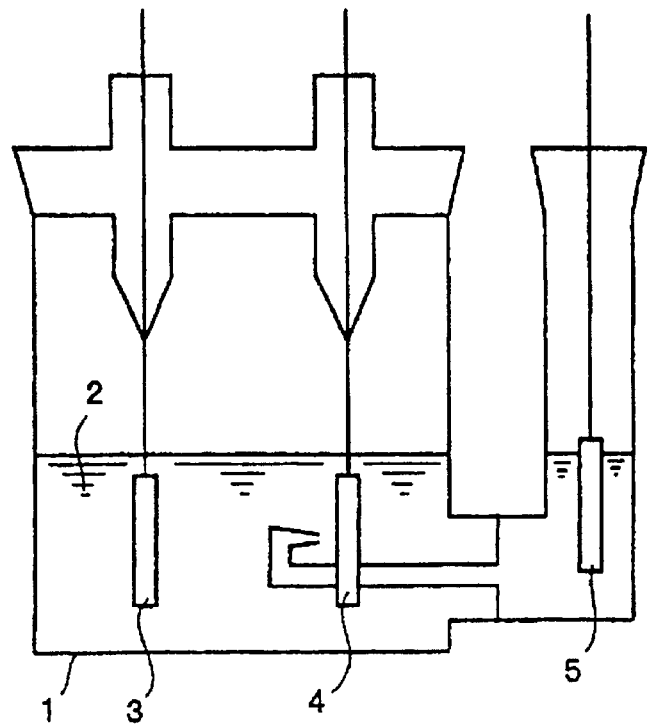
FIG. 2 is a schematic sectional view showing a beaker cell constructed in Examples of the present invention.

Each of the above-fabricated electrodes was cut into a 2 cm×2 cm size. Using this piece as a working electrode, a beaker cell as shown in FIG. 2 was assembled. As shown in FIG. 2, the beaker cell includes a counter electrode 3, a working electrode 4 and a reference electrode 5, which are all immersed in an electrolyte solution 2 contained in a container 1. The above-prepared electrolyte solution was used as the electrolyte solution 2. Lithium metal was used for both the counter electrode 3 and the reference electrode 5.

(Measurement of Cycle Characteristics)

The above-constructed beaker cell was charged at 25° C. at a constant current of 0.2 mA to 0 V (vs. Li/Li$^+$) and then discharged at 25° C. at a constant current of 0.2 mA to 2 V (vs. Li/Li$^+$). This unit cycle was repeated 10 times to determine a capacity retention rate which is defined by the following equation. The results are given in Table 4. Note that charge means the reduction of the working electrode and discharge means the oxidation thereof.

Capacity Retention Rate (%)=(10th-cycle discharge capacity/1st-cycle discharge capacity)×100.

TABLE 4

| Electrode | Type of Surface Coating Layer | Thickness of Surface Coating Layer (μm) | 24-Hour Heat Treatment at 200° C. | Capacity Retention Rate (%) |
| --- | --- | --- | --- | --- |
| a1 | Cu | 0.02 | Absent | 41 |
| a2 | Sn—Cu | 0.02 | Absent | 50 |
| b1 | — | 0 | Absent | 17 |

As can be clearly seen from the results shown in Table 4, the electrodes a1 and a2 of the present invention each with the surface coating layer on the layer of active material exhibit the higher capacity retention rate values compared to the comparative electrode b1 without the surface coating layer on the active material layer. This is considered due probably to the presence of the surface coating layer on a surface of the active material layer, which acted to prevent a reaction of the electrolyte and the surface of the active material layer.

(Experiment 2)

As analogous to Experiment 1, tin was deposited, in the form of a thin film having a thickness of 2 μm, on a 18 μm thick electrolytic copper foil (surface roughness Ra=0.188 μm) by an electroplating process, and a Cu layer serving as the surface coating layer was deposited on the tin thin film at thicknesses of 0.05 μm or 0.2 μm. Each stack was then subjected to a heat treatment at 200° C. for 24 hours. It was confirmed that this heat treatment resulted in the formation of a mixed phase at an interface between the Cu layer and the tin thin film for each electrode. The electrode with the 0.05 μm thick Cu layer was designated as an electrode c1 of the present invention and the stack with the 0.2 μm thick Cu layer was designated as an electrode c2 of the present invention.

For a comparative purpose, the comparative electrode b1 was subjected to a heat treatment at 200° C. for 24 hours and designated as a comparative electrode d1.

In the same manner as in Experiment 1, beaker cells were constructed using the fabricated electrodes, subjected to a charge-discharge test and determined for capacity retention rate. The results are given in Table 5.

TABLE 5

| Electrode | Type of Surface Coating Layer | Thickness of Surface Coating Layer (μm) | 24-Hour Heat Treatment at 200° C. | Capacity Retention Rate (%) |
| --- | --- | --- | --- | --- |
| c1 | Cu | 0.05 | Present | 88 |
| c2 | Cu | 0.2 | Present | 87 |
| d1 | — | 0 | Present | 80 |

As can be clearly seen from the results shown in Table 5, the electrodes c1 and c2 of the present invention each with the surface coating layer exhibit the higher capacity retention rate values compared to the comparative electrode d1. This is considered due probably to the provision of the surface coating layer which acted to prevent a reaction of the electrolyte and the surface of the active material layer.

FIG. 1 shows 2nd-cycle charge curves for the electrode c1 of the present invention and the comparative electrode d1. An abscissa indicates a rate of charge and an ordinate indicates a potential versus lithium. Although not observed in the first cycle, the comparative electrode d1 in its second cycle gives a profile due likely to its reaction with the electrolyte at a potential of around 1.1 V versus lithium and shows a low charge-discharge efficiency of 81%. In contrast, the electrode c1 of the present invention does not give such a profile and shows a high charge-discharge efficiency of 99%. It is accordingly believed that the presence of the surface coating layer on the active material layer inhibits a reaction of the electrolyte and the surface of the active material layer and this inhibition permits the electrode c1 of the present invention to provide the increased charge-discharge efficiency and the improved charge-discharge cycle characteristics.

In accordance with the present invention, an electrode for a rechargeable lithium battery can be provided which has a high discharge capacity and shows superior charge-discharge cycle characteristics.

What is claimed is:

1. An electrode for a rechargeable lithium battery, comprising;
    a current collector layer composed of a metal incapable of alloying with Li;
    a layer of a metal capable of alloying with Li provided on said current collector layer as an active material layer, said metal capable of alloying with lithium being in contact with said current collector layer;
    a surface coating layer provided on a surface of said active material layer, opposite to the surface on which the current collector layer is provided, and composed of a metal incapable of alloying with Li or composed of an alloy of a metal incapable of alloying with Li and a metal capable of alloying with Li; and
    a mixed phase in which a component of said surface coating layer is mixed with a component of said active material layer formed at an interface between the surface coating layer and the active material layer.

2. The electrode for a rechargeable lithium battery as recited in claim 1, wherein said metal capable of alloying with Li and constituting said surface coating layer is identical in type to the metal capable of alloying with Li and constituting said active material layer.

3. The electrode for a rechargeable lithium battery as recited in claim 1, wherein said metal incapable of alloying with Li and constituting said surface coating layer is identical in type to the metal incapable of alloying with Li and constituting said current collector layer.

4. The electrode for a rechargeable lithium battery as recited in claim 1, wherein said metal capable of alloying with Li is Sn.

5. The electrode for a rechargeable lithium battery as recited in claim 1, wherein said metal incapable of alloying with Li is Cu.

6. The electrode for a rechargeable lithium battery as recited in claim 1, wherein provision of said active material layer is achieved by depositing a metal capable of alloying with Li on a substrate serving as said current collector layer.

7. The electrode for a rechargeable lithium battery as recited in claim 1, wherein provision of said current collector layer is achieved by depositing a metal incapable of alloying with Li on a substrate serving as said active material layer.

8. The electrode for a rechargeable lithium battery as recited in claim 1, wherein said surface coating layer is deposited on the active material layer by a plating or sputtering technique.

9. The electrode for a rechargeable lithium. battery as recited in claim 1, wherein said surface coating layer includes Cu.

10. The electrode for a rechargeable lithium battery as recited in claim 1, wherein said surface coating layer is composed of an Sn—Cu alloy.

11. The electrode for a rechargeable lithium battery as recited in claim 1, wherein said mixed phase is formed by depositing said surface coating layer on said active material layer and then being subjected to a heat treatment.

12. The electrode for a rechargeable lithium battery as recited in claim 1, wherein said surface coating layer has a thickness up to 0.2 $\mu$m.

13. A rechargeable lithium battery characterized as including a negative electrode comprised of the electrode as recited in claim 1, a positive electrode and a nonaqueous electrolyte.

* * * * *